United States Patent
Yao et al.

(10) Patent No.: US 12,397,680 B2
(45) Date of Patent: Aug. 26, 2025

(54) ACTIVE AND PASSIVE HEAT FLUX CONTROL SYSTEMS FOR TWO-PHASE IMMERSIVE COOLING FOR HIGH POWER DENSITY ELECTRIC VEHICLE COMPONENTS

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Ming Liu, Shanghai (CN); Chih-hung Yen, Bloomfield Hills, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 626 days.

(21) Appl. No.: 17/848,433

(22) Filed: Jun. 24, 2022

(65) Prior Publication Data

US 2023/0264602 A1   Aug. 24, 2023

(30) Foreign Application Priority Data

Feb. 18, 2022   (CN) .......................... 202210150488.0

(51) Int. Cl.
  *B60L 58/26*   (2019.01)
  *B60L 50/60*   (2019.01)
  *B60L 50/64*   (2019.01)

(52) U.S. Cl.
  CPC ............... *B60L 58/26* (2019.02); *B60L 50/64* (2019.02); *B60L 50/66* (2019.02);
  (Continued)

(58) Field of Classification Search
  CPC .............. B60L 58/26; B60L 2240/425; H01M 10/613; H01M 10/63; H01M 10/6569; H05K 7/20881; H05K 7/20936
  (Continued)

(56) References Cited

U.S. PATENT DOCUMENTS 9,464,854 B2 * 10/2016 Shelnutt ............. H05K 7/20236
2010/0009244 A1   1/2010 Murata
(Continued)

FOREIGN PATENT DOCUMENTS

EP    2290729 A1   3/2011
EP    3018728 A1   5/2016

OTHER PUBLICATIONS

German Office Action from counterpart DE1020221182266, dated Feb. 25, 2025.

*Primary Examiner* — Steve S Tanenbaum (57) ABSTRACT

A cooling system includes a housing configured to enclose an electric vehicle component immersed in cooling fluid and to define a first volume. A variable volume member defines a second volume that varies in response to a first signal. A combined volume is defined by the first volume and the second volume. Heat causes the cooling fluid to transition between a liquid state and a vapor state in the combined volume. A pressure sensor is configured to sense a pressure in the combined volume. A condenser is configured to cause the cooling fluid to transition from the vapor state back to the liquid state. A controller includes a volume adjustment module configured to generate the first signal to vary the second volume of the variable volume member to adjust the combined volume in response to the pressure and a first temperature of the electric vehicle component.

20 Claims, 6 Drawing Sheets

(52) U.S. Cl.
CPC ... *B60L 2240/425* (2013.01); *B60L 2240/525* (2013.01); *B60L 2240/545* (2013.01)

(58) Field of Classification Search
USPC .......................................................... 165/279
See application file for complete search history.

(56) References Cited

U.S. PATENT DOCUMENTS

2017/0295670 A1* 10/2017 Campbell .......... H05K 7/20236
2018/0006346 A1 1/2018 Smith et al.

* cited by examiner

ACTIVE AND PASSIVE HEAT FLUX CONTROL SYSTEMS FOR TWO-PHASE IMMERSIVE COOLING FOR HIGH POWER DENSITY ELECTRIC VEHICLE COMPONENTS

CROSS-REFERENCE TO RELATED APPLICATIONS

This application claims the benefit of Chinese Patent Application No. 202210150488.0, filed on Feb. 18, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicle components, and more particularly to cooling systems for electric vehicle components.

Electric vehicles (EVs) include a battery system with one or more battery cells, modules and/or packs. The EV can be a battery electric vehicle (BEV), a fuel cell vehicle or a hybrid vehicle. A power control system is used to control charging and/or discharging of the battery system during charging, regeneration and/or driving. During driving, one or more electric motors of the EV receive power from the battery system to provide propulsion for the vehicle and/or to return power to the battery system during regeneration and/or charging from a utility.

During operation, power is delivered by the battery system to the motor(s) and returned by the motor(s) to the battery system using one or more EV components such as power inverters, DC-DC converters and/or other EV components. The battery system is designed to deliver high power when requested, absorb high power quickly during charging from the utility and/or to absorb high power during regeneration. The battery systems are expected to continue to increase in power density and operate at higher voltage levels. When operating under these conditions, significant heating of the battery cells, the battery modules, the battery pack, the power inverters, the DC-DC converters and/or other EV components can occur.

SUMMARY

A cooling system for an electric vehicle component includes a housing configured to enclose an electric vehicle component immersed in cooling fluid and to define a first volume. A variable volume member defines a second volume that varies in response to a first signal. A combined volume is defined by the first volume and the second volume. Heat from operation of the electric vehicle component causes the cooling fluid to transition between a liquid state and a vapor state in the combined volume. A pressure sensor is configured to sense a pressure in the combined volume during operation. A condenser is arranged in the housing and is configured to cause the cooling fluid to transition from the vapor state back to the liquid state. A controller includes a volume adjustment module configured to generate the first signal to vary the second volume of the variable volume member to adjust the combined volume in response to the pressure and a first temperature of the electric vehicle component.

In other features, a temperature sensor is configured to sense the first temperature of the electric vehicle component. The variable volume member comprises a bellows moveable between a first position and a second position. The first position corresponds to a lowest value of the second volume and the second position corresponds to a highest value of the second volume. An actuator in communication with the controller causes the bellows to move between the first position and the second position.

In other features, the controller further comprises a first operational lookup table. The controller indexes the first operational lookup table using the pressure to identify a saturation temperature. The controller generates a pressure difference between the saturation temperature and the first temperature. The controller determines whether the pressure difference is within a predetermined temperature range. The controller adjusts the first signal to vary the pressure in the combined volume in response to the determination that the pressure difference is not within the predetermined temperature range.

In other features, a pressure wave generator is in communication with the controller and is configured to selectively generate pressure waves in the cooling fluid to decrease bubbles accumulating on the electric vehicle component. The variable volume member comprises a bellows including an open end in fluid communication with the first volume and a closed end, a rod including a first end connected to the bellows, and an actuator connected to a second end of the rod.

A system comprises the cooling system and the electric vehicle component. The electric vehicle component is selected from a group consisting of a battery cell, a battery module, a battery pack, a power inverter, and a DC-DC converter.

A cooling system for an electric vehicle component includes a housing configured to enclose an electric vehicle component immersed in cooling fluid. Heat from operation of the electric vehicle component causes the cooling fluid to transition between a liquid state and a vapor state. A condenser is arranged in the housing and is configured to cause the cooling fluid to transition from the vapor state back to the liquid state. A pressure wave generator is configured to selectively generate pressure waves in the cooling fluid. A controller is configured adjust operation of the pressure wave generator in response to a first temperature of the electric vehicle component.

In other features, a temperature sensor is configured to sense the first temperature of the electric vehicle component. The controller adjusts operation of the pressure wave generator in response to a difference between the first temperature and a predetermined temperature.

A system comprises the cooling system and the electric vehicle component. The electric vehicle component is selected from a group consisting of a battery cell, a battery module, a battery pack, a power inverter, and a DC-DC converter.

A cooling system for an electric vehicle component comprises a housing enclosing an electric vehicle component immersed in cooling fluid and defining a first volume. Heat from operation of the electric vehicle component causes the cooling fluid to transition between a liquid state and a vapor state. A condenser is arranged in the housing and is configured to cause the cooling fluid to transition from the vapor state back to the liquid state. A variable volume member defines a second volume in fluid communication with the first volume. The second volume varies in response changes in pressure in the housing.

In other features, the variable volume member comprises a bellows including an open end in fluid communication with the first volume and a closed end.

A system comprises the cooling system and the electric vehicle component. The electric vehicle component is selected from a group consisting of a battery cell, a battery module, a battery pack, a power inverter, and a DC-DC converter.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As described above, the power density and operating voltage of battery systems for EVs has increased significantly. Heating of EV components such as the battery cells, the battery module(s), the battery pack(s), the power inverter(s), the DC-DC converter(s) and/or other EV component(s) may occur. Cooling systems are used to maintain the EV components in a temperature range to ensure optimal performance and/or to prevent premature damage/wear due to excessive operating temperatures.

Single-phase cooling systems have been used to cool EV components. The cooling fluid may be supplied by a cooling fluid source and pump through a cooling loop including a housing for the EV component. The cooling fluid exchanges heat with surfaces of the EV component. The cooling is performed without a phase change of the cooling fluid. After being heated by the EV component, the cooling fluid is cooled using a radiator and/or fan and then returned to the cooling fluid source. While single-phase cooling systems may work in some applications, higher power density applications require higher cooling capacity. Cooling systems and methods according to the present disclosure relate to two-phase cooling involving a phase change of the cooling fluid from a liquid state to a vapor state. Two-phase cooling systems provide about ten times the cooling capacity of single-phase cooling systems.

Figure 1:
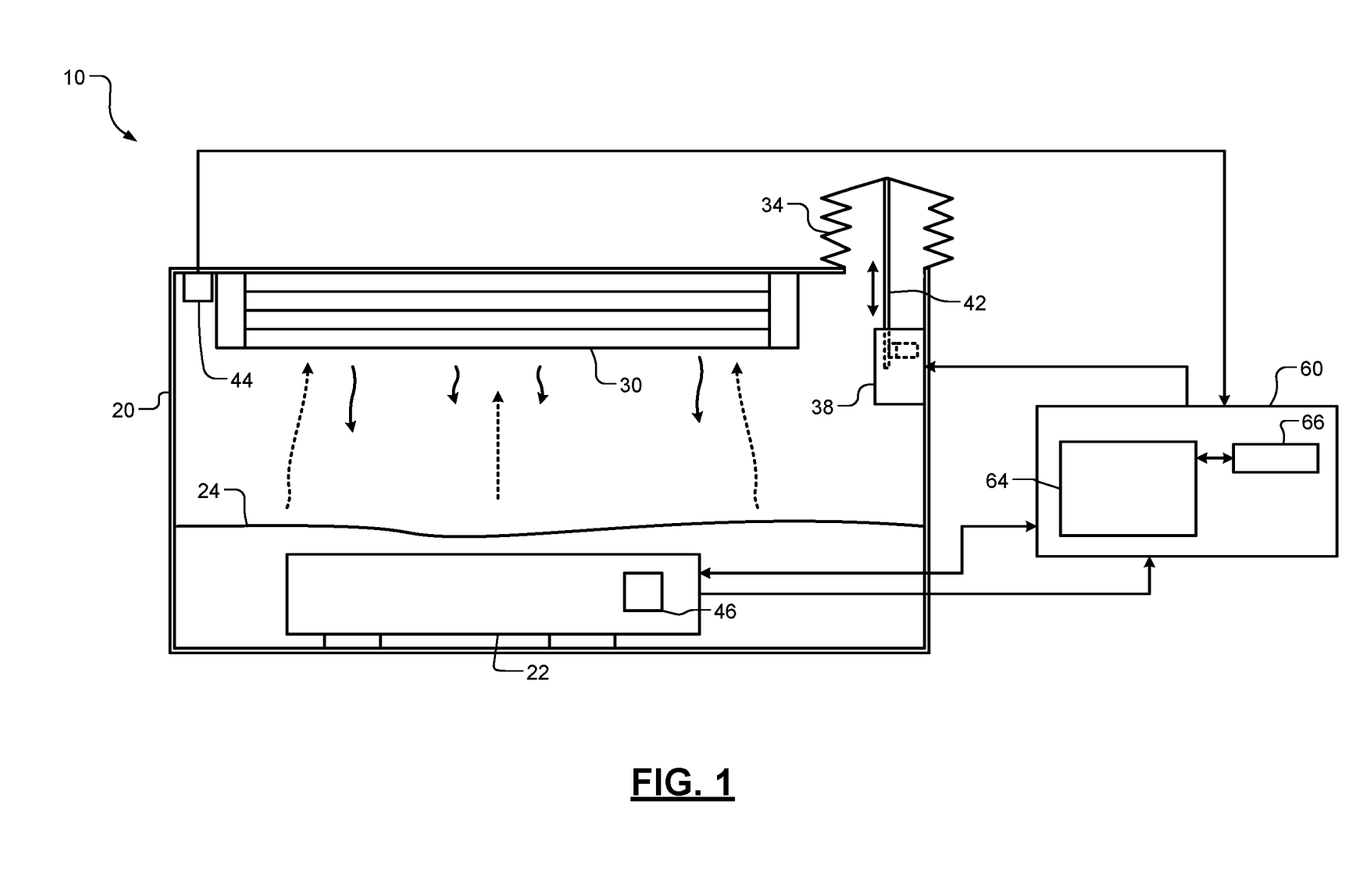
FIG. 1 is a functional block diagram of an example of a cooling system including an active variable volume member for an electric vehicle (EV) component according to the present disclosure.

Referring now to FIG. 1, an active cooling system 10 includes a housing 20 for an electric vehicle (EV) component 22. During use, the EV component 22 is immersed in cooling fluid 24. Heat from the EV component 22 is absorbed by the cooling fluid, which causes the cooling fluid 24 to transition from the liquid state to the vapor state. The vapor is cooled by a condenser 30 from the vapor state back into the liquid state and the process repeats.

As will be described further below, the active cooling system 10 varies a volume of a variable volume member 34 to adjust a combined volume of the housing 20 and the variable volume member 34. In other words, the housing 20 defines a first volume and the variable volume member 34 defines a second volume in fluid communication with the first volume. The first and second volumes collectively define the combined volume. In some examples, the second volume has a maximum volume in a range from 5% to 25% of the first volume, although larger or smaller volume values may be used.

In some examples, the variable volume member 34 includes a bellows including flexible sides to allow the variable volume member 34 to retract and expand to alter the second volume of the variable volume member 34. An actuator 38 moves the bellows in between first and second positions (and/or one or more positions therebetween). In some examples, the actuator 38 includes a motor, a threaded member, and a threaded rod 42, although other types of actuators can be used. The motor rotates the threaded member to change the linear position of the threaded rod 42. In other examples, a housing is split into a plurality of sub-chambers and valves are used to selectively connect successive ones of the sub-chambers together (or to block the connection) to increase (or decrease) the second volume.

A controller 60 communicates with a pressure sensor 44 to sense pressure in the housing 20. The controller 60 further communicates with a temperature sensor 46 sensing a temperature of the EV component 22. In some examples, the EV component 22 comprises a power inverter including one or more integrated circuits (ICs) mounted on a copper plate arranged on insulating legs made of ceramic or another insulating material and the temperature sensor 46 senses a surface temperature of the copper plate.

In some examples, the controller 60 also generates control signals to control components of the EV component 22 such as power switches, although this function may also be performed by another vehicle controller. The controller 60 includes a volume adjustment module 64 configured to determine a desired volume for the variable volume member 34 and to adjust the second volume accordingly. The controller 60 further includes a first operational lookup table (LUT) 66 defining phases of the cooling fluid with respect to the pressure P and the saturation pressure $T_{sat}$.

Figure 2:
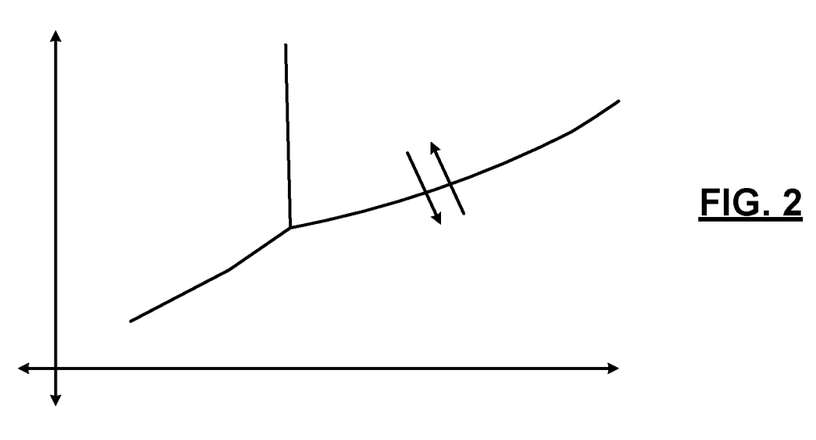
FIG. 2 is a graph illustrating an example of phase changes for the cooling fluid as a function of saturation temperature and pressure.

Referring now to FIG. 2, phase changes of the cooling fluid are shown as a function of saturation temperature $T_{sat}$ and pressure P. Since the pressure P within the housing is known, the phase change relationship can be used to identify the saturation temperature $T_{sat}$ for a given pressure P at the transition between a liquid state and a vapor state.

Figure 3:
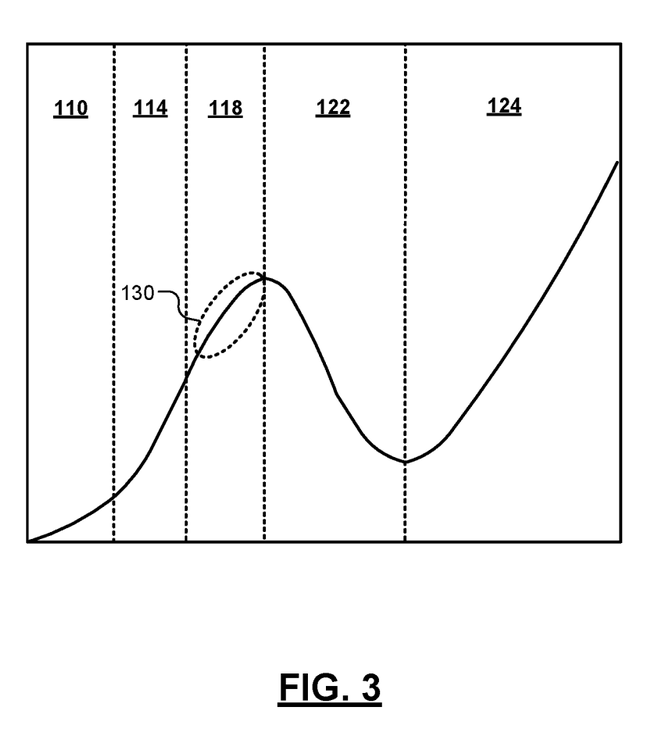
FIG. 3 is a graph illustrating an example of heat flux as a function of a difference between a temperature of the EV component and a saturation temperature.

Referring now to FIG. 3, heat flux (q") is shown as a function of a difference between a temperature (T) of the EV component and a saturation temperature ($T_{sat}$). In some examples, Novec™ cooling fluid is used, although other types of cooling fluid can be used. The cooling system operates in various different phase regions depending on the temperature difference ΔT. The different phase regions include a single-phase convection region 110, a nucleate boiling with isolated bubbles region 114, a nucleate boiling with jets and columns region 118, a transition boiling region 122 and a film boiling region 124.

Optimum cooling performance occurs in the region corresponding to the nucleate boiling with jets and columns region 118. As will be described below, the controller 60 adjusts the combined volume (and indirectly pressure) in the housing using the variable volume member 34. The controller attempts to maintain the temperature difference (ΔT) in a predetermined temperature range corresponding to the nucleate boiling with jets and columns region 118. In other words, the controller 60 compares the temperature difference to the predetermined temperature range and adjusts the second volume accordingly.

More particularly, the combined volume is decreased when the temperature difference (ΔT) is greater than the predetermined temperature range to reduce the pressure P (and eventually increase $T_{sat}$). The combined volume is increased when the temperature difference (ΔT) is less than the predetermined temperature range to increase pressure P (and eventually decrease $T_{sat}$).

Figure 4:
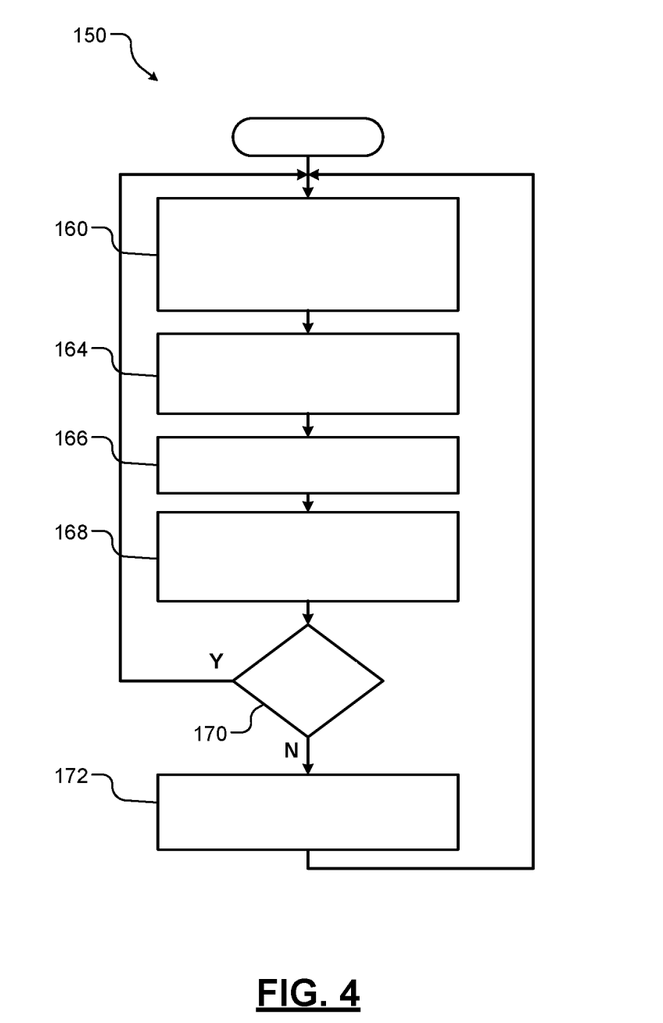
FIG. 4 is a flowchart of an example of a method for controlling an actuator to vary a volume with a housing surrounding an EV component immersed in cooling fluid according to the present disclosure.

Referring now to FIG. 4 a method 150 for controlling the variable volume member to vary pressure within a housing for the EV component is shown. At 160, the pressure P in the housing 20 and the temperature T of the EV component 22 are measured. At 164, the first operational LUT is indexed using P to determine $T_{sat}$ for a gas-liquid transition point. At 166, a difference ΔT between T and $T_{sat}$ is determined. At 168, the temperature difference ΔT is compared to a predetermined temperature range corresponding to the nucleate boiling with jets and columns region 118.

If the temperature difference is in the predetermined temperature range, then the method returns to 110. If the temperature difference is not within the predetermined temperature range as determined at 170, then the pressure is adjusted at 172 by changing the combined chamber volume using the variable volume member 34 and then control returns to 110.

Figure 5:
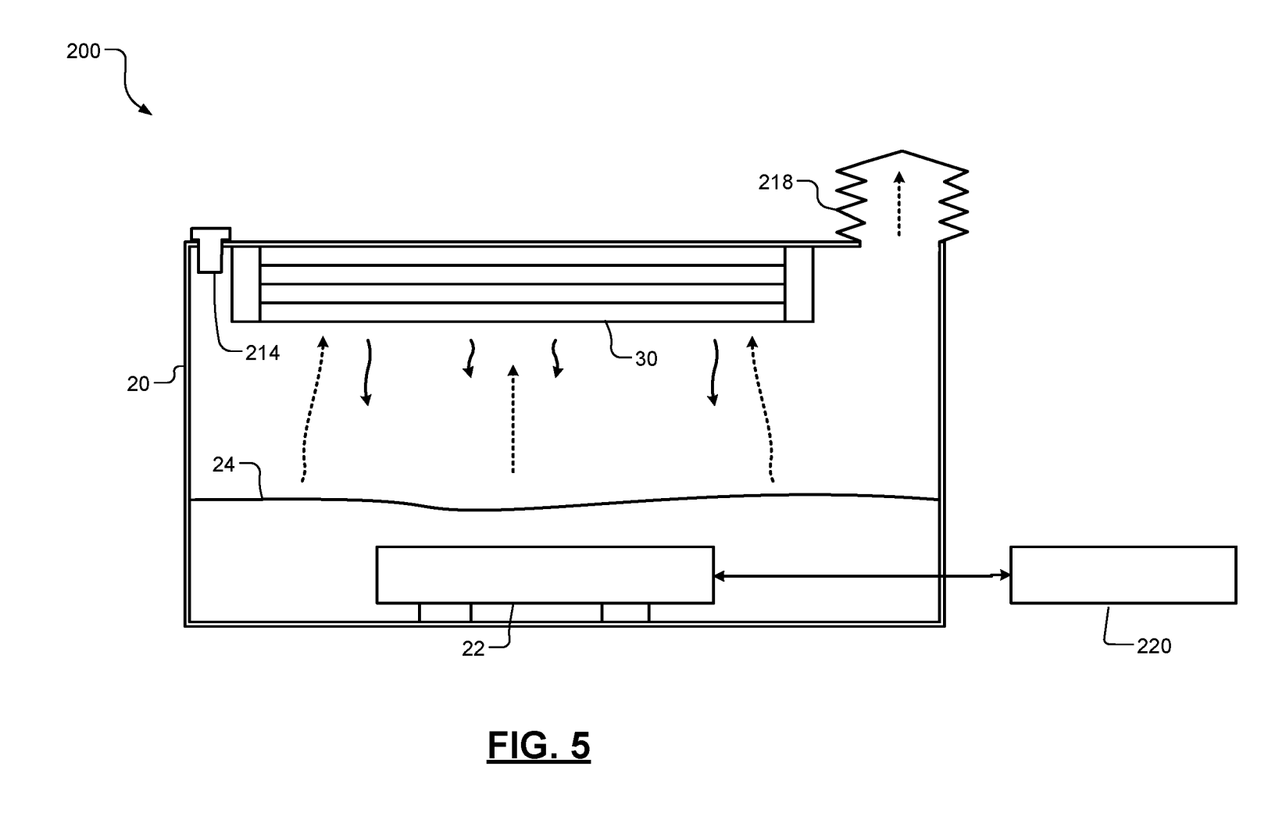
FIGS. 5-6 are functional block diagrams of an example of a passive cooling system for an EV component that includes a passive variable volume member according to the present disclosure.
Figure 6:
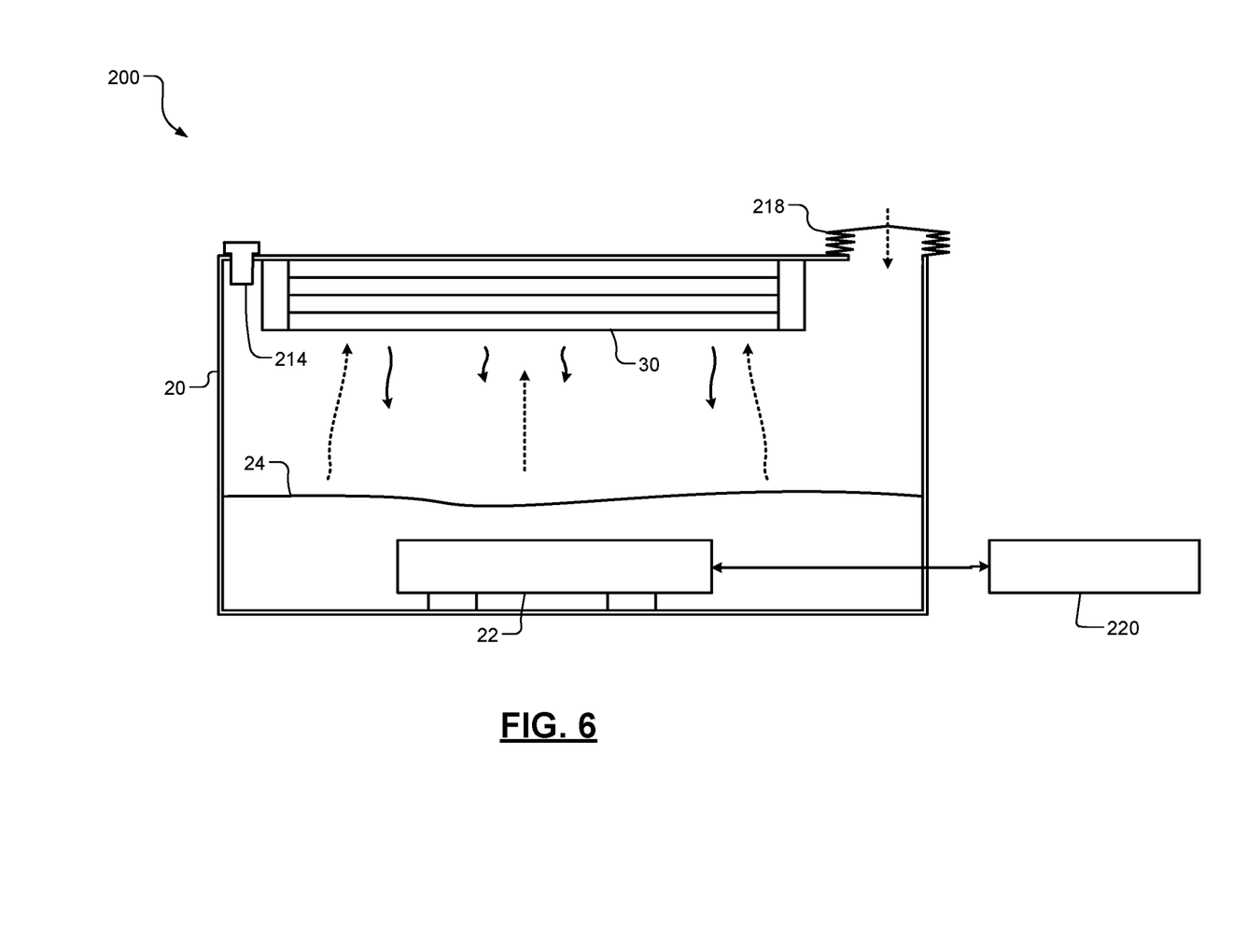

Referring now to FIGS. 5-6, a passive cooling system 200 for the EV component 22 is shown. The housing 20 is attached to a variable volume member 218. In this example, the controller 220 controls operation of the EV component but is not involved in the control of the variable volume member 218. The housing 20 and the variable volume member 218 provide a combined volume that adaptively changes depending upon the vapor pressure or load.

Under high load conditions with high vapor pressure, the variable volume member 218 adjusts (e.g. expands) and the combined volume has a maximum volume as shown in FIG. 5. Under low load conditions with less vapor pressure, the variable volume member 218 adjusts (e.g. retracts) and the combined volume has a minimum volume as shown in FIG. 6. In some examples, a pressure relief valve 214 is arranged in fluid communication with the housing 20. The pressure relief valve 214 opens to release pressure when the pressure in the housing is greater than a predetermined pressure threshold.

Figure 7:
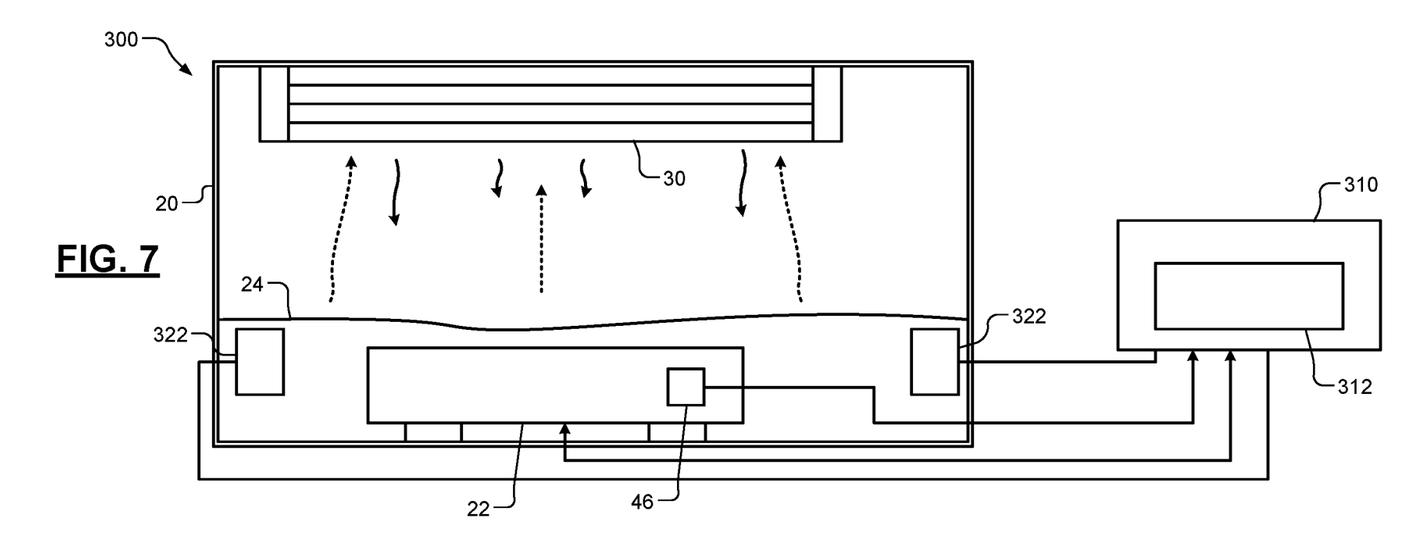
FIG. 7 is a functional block diagram of an example of another active cooling system for the EV component according to the present disclosure.

Referring now to FIG. 7, an active cooling system 300 for the EV component is shown. The active cooling system 300 includes a controller 310 and one or more pressure wave generators (WG) 322 that selectively generate pressure waves in the cooling fluid at one or more amplitudes, frequencies and/or patterns (in phase or out of phase).

During heating of the cooling fluid, bubbles form in the cooling fluid and may attach to surfaces of the EV component. More efficient cooling occurs when the pressure waves are generated and the bubbles do not remain on the surfaces of the EV component and new bubbles are generated more readily. Removing bubbles will also tend to decrease the temperature of the EV component. Less efficient cooling occurs when the pressure waves are smaller or not used, the bubbles remain on the surfaces of the EV component and fewer bubbles are generated. Increasing bubbles on the EV component will also tend to increase the temperature of the EV component. The one or more pressure wave generators 322 generate pressure waves that pass through the cooling fluid at one or more amplitudes and dislodge bubbles forming on the surfaces of the EV component. Modulation of the bubbles on and off or at different amplitudes and/or frequencies can be used to vary $T_{sat}$.

A controller 310 includes a pressure wave control module 312 configured to selectively adjust the pressure waves in response to the temperature of the EV component. In other words, when the temperature of the EV component is greater than a predetermined threshold, the controller 310 causes the one or more pressure wave generators 322 to generate pressure waves and/or increase the amplitude or frequency of the pressure waves.

As can be appreciated, the one or more pressure wave generators 322 can be turned on and off and/or modulated between two or more wave amplitudes in response to the difference between the temperature of the EV component and the predetermined temperature threshold. In some examples, two or more pressure wave generators are used. In some examples, the two or more pressure wave generators are operated in phase. In other examples, the two or more pressure wave generators are operated out of phase.

Figure 8:
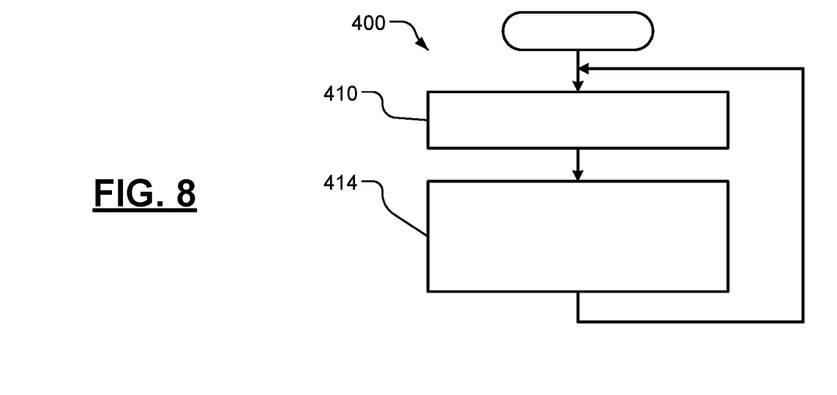
FIG. 8 is a flowchart of an example of a method for controlling one or more pressure wave generators to clear bubbles forming on the EV component to adjust the temperature of the EV component according to the present disclosure.

Referring now FIG. 8, a method 400 for controlling the one or more pressure wave generators 322 is shown. At 410, the temperature T of the EV component is measured. At 414, operation of the one or more wave generators is adjusted based on a difference between the temperature T and a predetermined temperature threshold.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cooling system for an electric vehicle component, comprising:
   a housing configured to enclose an electric vehicle component immersed in cooling fluid and to define a first volume,
   a variable volume member defining a second volume that varies in response to a first signal, wherein a combined volume is defined by the first volume and the second volume,
   wherein heat from operation of the electric vehicle component causes the cooling fluid to transition between a liquid state and a vapor state in the combined volume;

a pressure sensor configured to sense a pressure in the combined volume during operation;

a condenser arranged in the housing and configured to cause the cooling fluid to transition from the vapor state back to the liquid state; and a controller including a volume adjustment module configured to generate the first signal to vary the second volume of the variable volume member to adjust the combined volume in response to the pressure and a first temperature of the electric vehicle component.

2. The cooling system of claim 1, further comprising a temperature sensor configured to sense the first temperature of the electric vehicle component.

3. The cooling system of claim 1, wherein the variable volume member comprises:

a bellows moveable between a first position and a second position, wherein the first position corresponds to a lowest value of the second volume and the second position corresponds to a highest value of the second volume; and an actuator in communication with the controller to cause the bellows to move between the first position and the second position.

4. The cooling system of claim 1, further comprising a pressure wave generator in communication with the controller and configured to selectively generate pressure waves in the cooling fluid to decrease bubbles accumulating on the electric vehicle component.

5. The cooling system of claim 1, wherein the variable volume member comprises:

a bellows including an open end in fluid communication with the first volume and a closed end;

a rod including a first end connected to the bellows; and an actuator connected to a second end of the rod.

6. The cooling system of claim 1, wherein:

the controller further comprises a first operational lookup table, and the controller indexes the first operational lookup table using the pressure to identify a saturation temperature.

7. The cooling system of claim 6, wherein the controller generates a pressure difference between the saturation temperature and the first temperature.

8. The cooling system of claim 7, the controller determines whether the pressure difference is within a predetermined temperature range.

9. The cooling system of claim 8, wherein the controller adjusts the first signal to vary the pressure in the combined volume in response to the determination that the pressure difference is not within the predetermined temperature range.

10. A cooling system for an electric vehicle component, comprising:

a housing configured to enclose an electric vehicle component immersed in cooling fluid, wherein heat from operation of the electric vehicle component causes the cooling fluid to transition between a liquid state and a vapor state;

a condenser arranged in the housing and configured to cause the cooling fluid to transition from the vapor state back to the liquid state;

a pressure wave generator configured to selectively generate pressure waves in the cooling fluid; and a controller configured adjust operation of the pressure wave generator in response to a first temperature of the electric vehicle component.

11. The cooling system of claim 10, further comprising a temperature sensor configured to sense the first temperature of the electric vehicle component.

12. The cooling system of claim 11, wherein the controller adjusts operation of the pressure wave generator in response to a difference between the first temperature and a predetermined temperature.

13. A cooling system for an electric vehicle component, comprising:

a housing enclosing an electric vehicle component immersed in cooling fluid and defining a first volume, wherein heat from operation of the electric vehicle component causes the cooling fluid to transition between a liquid state and a vapor state;

a condenser arranged in the housing and configured to cause the cooling fluid to transition from the vapor state back to the liquid state;

a variable volume member defining a second volume in fluid communication with the first volume, wherein a combined volume is defined by the first volume and the second volume;

an actuator configured to cause the variable volume member to move between a first position and a second position;

a pressure sensor configured to sense a pressure in the combined volume during operation; and a controller in communication with the actuator, the controller configured to control the actuator, in response to the pressure, causing the variable volume member to move between the first position and the second position to vary the second volume of the variable volume member and to adjust the combined volume in response to the pressure.

14. The cooling system of claim 13, wherein the variable volume member comprises a bellows including an open end in fluid communication with the first volume and a closed end.

15. The cooling system of claim 14, wherein the closed end of the bellows is arranged outside of the housing.

16. The cooling system of claim 14, further comprising a temperature sensor configured to sense a first temperature of the electric vehicle component.

17. The cooling system of claim 16, the controller comprises a first operational lookup table, and the controller indexes the first operational lookup table using the pressure to identify a saturation temperature.

18. The cooling system of claim 17, wherein the controller generates a pressure difference between the saturation temperature and the first temperature.

19. The cooling system of claim 18, the controller determines whether the pressure difference is within a predetermined temperature range.

20. The cooling system of claim 19, wherein the controller varies the pressure in the combined volume in response to the determination that the pressure difference is not within the predetermined temperature range.

\* \* \* \* \*